Aug. 23, 1932.　　A. W. REYNOLDS　　1,873,033
AUTOMOBILE SIGNALING DEVICE
Filed Jan. 29, 1932
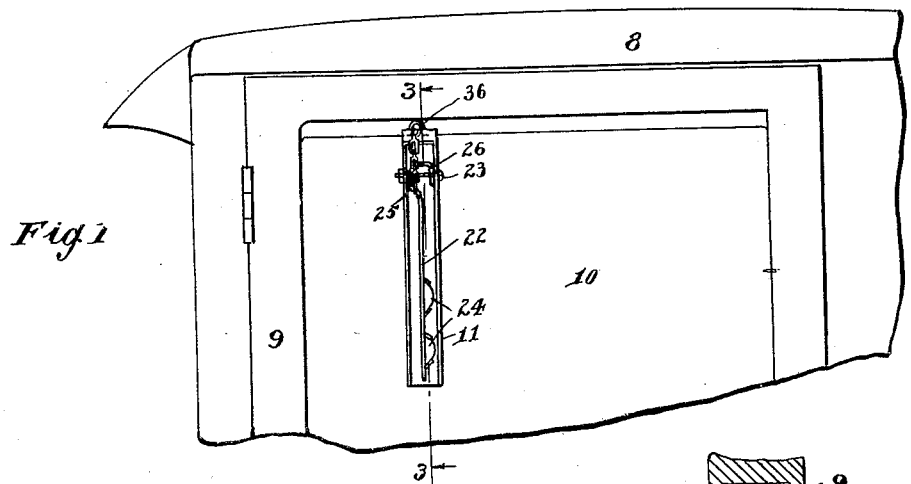
Fig.1
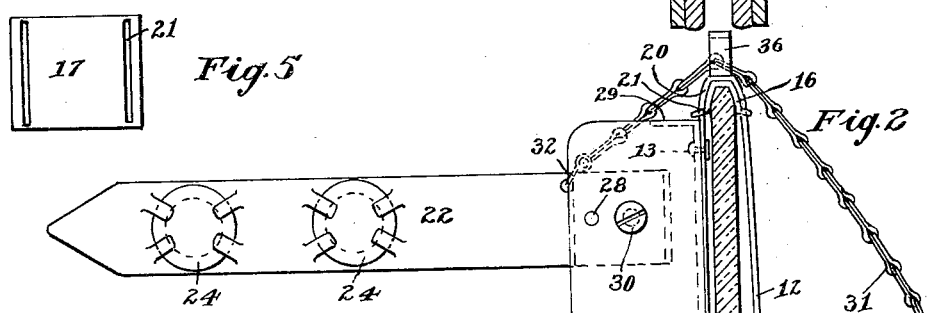
Fig.5
Fig.2
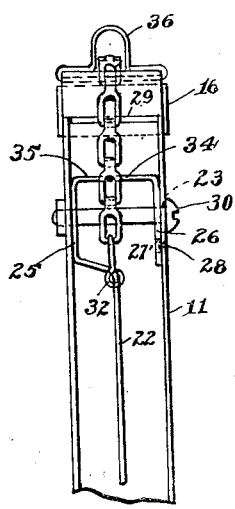
Fig.4
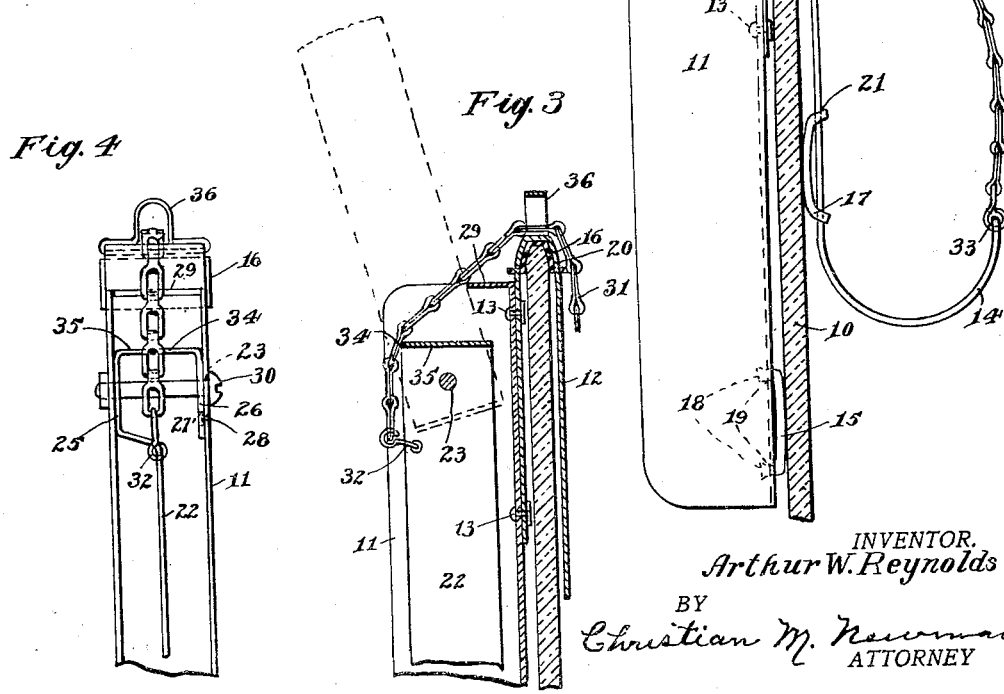
Fig.3
INVENTOR.
Arthur W. Reynolds
BY
Christian M. Newman
ATTORNEY Patented Aug. 23, 1932

1,873,033

UNITED STATES PATENT OFFICE

ARTHUR W. REYNOLDS, OF LEONARDSVILLE, NEW YORK

AUTOMOBILE SIGNALING DEVICE

Application filed January 29, 1932. Serial No. 589,562.

This invention relates to vehicle direction signaling means, such as are adapted to be attached to an automobile and to be manually operated, whereby the driver of the vehicle may indicate the direction the vehicle is to take.

The object of the invention is to produce a novel form of signaling means which is simple in construction and can be inexpensively manufactured and sold at a price within reach of all automobile users.

A further object of the invention is to provide a signaling device that can be conveniently and quickly attached to and detached from the top edge portion of the movable glass, in the door of an automobile adjacent to the driver's seat, in a manner to permit the glass to be shoved up to a near closed position, and to provide means whereby the driver may conveniently operate the signal from time to time as occasion may require, and likewise see that the device is properly functioning.

My invention is further constructed so as to be noticeably displayed from the side of the car whereby the driver's intention of stopping or turning to the right or left can be readily determined by the drivers of cars following or approaching, and furthermore to include reflecting means so that the signaling device can be readily seen at night, and the direction of turning also plainly indicated at night.

With these and other objects in view, as will hereinafter appear, my invention resides and consists in certain novel features of construction, combination and arrangement of parts as will be hereinafter described in detail and more particularly set forth in the accompanying claims, reference being had to the accompanying drawing and to the characters of reference marked thereon which form a part of this specification and in which Fig. 1 shows a side elevation of the front portion of an automobile illustrating my improved signaling device applied to the top edge of the glass of the front left side door thereof;

Fig. 2 shows a rear side elevation, on an enlarged scale, of the signaling device as shown in Fig. 1 applied to the door glass, the signaling arm being in an extended signaling position;

Fig. 3 shows a longitudinal sectional view through the signaling device partly broken away, on an enlarged scale and taken on line 3—3 of Fig. 1, the pointer of which is shown in a depending normal inoperative position;

Fig. 4 shows an outside elevational view of the signaling means, also on an enlarged scale, as seen in Fig. 1 and from the left of Fig. 3; and Fig. 5 shows a detached plan view of one of the attachable rubber pieces used upon the spring attaching member of the indicator.

Referring in detail to the characters of reference marked upon the drawing, 8 represents the cab or housing of an automobile and 9 the left side door thereof, adjacent to the driver's seat, which carries a vertical movable glass 10. 11 represents a frame or housing member which is bent up from sheet metal to form an elongated channel that is supported in a vertical position against the outside of the vertically adjustable glass 10 that forms a member of the door of an automobile. A suitable flat bent spring steel strip 12 is riveted as at 13—13, or otherwise secured to the back of the channel frame member 11 and has its outer yieldable spring end portion, in part, disposed in parallel spaced relation to the inside of the glass 10 and its remaining free end portion 14 bent around in substantially the manner illustrated in Fig. 2 and provides a yieldable means of removability in attaching the signaling device to the glass.

Suitable pads 15, 16 and 17 are provided intermediate of the frame member 11, the spring attaching member 12 and the glass 10; the first mentioned pad 15 being located against the lower side portion of the back of the frame, and preferably attached by having its free ends 18 disposed in cross slots 19 in the back of the frame in a way to secure the pad to the frame, and the free ends 18 forming silent bumpers for the pointer arm 22 when dropped. The pad 16 which is arranged in the bend 20 at the top of the spring member 12 is positioned against the inside of said bend so as to rest between said bend and the top edge of the glass. This pad is preferably made of soft rubber, and like the pad 17 is cut and shaped for attachment to the spring substantially as shown in Fig. 5, being provided with transverse slots 21 whereby said pads may be threaded on the spring member and positioned as shown in the drawing. The use of these pads obviously insures not only a firm engagement of the signaling device with the glass, but prevents rattling, displacement and scratching of the glass.

A signaling arm 22 is hingedly mounted as at 23 between the two parallel side portions of the channel frame and is adapted to be raised from the depending position shown in Figs. 1, 3 and 4 to either position shown in full lines in Fig. 2 or dotted lines shown in Fig. 3, the first of which to automobile drivers indicates a left turn and the second position a right turn or stop, as is customary with the hand. This signaling arm is preferably formed of a single piece of sheet metal that is stamped out to receive one or more red glass reflectors 24 which are readily seen from the rear, when the light of an aproaching head light is thrown thereagainst. If two glasses are used they would be in alignment, as shown, whereas if but one is employed, it would preferably be of an elongated shape and disposed longitudinally of the arm. The inner supporting end portion of this arm is bent out, across and returned to form parallel spaced apart side members 25 and 26, that operatively fit between the sides of the channel frame 11.

The member 26 forms a yieldable part which is provided with a small hole 27 upon one side that is adapted to engage a boss 28 in the frame 11 to support the arm in a right angle position, and from which position it can be further raised to the position shown in dotted lines in Fig. 3, and wherein said arm is also shown in engagement with the stop 29 formed in the top of the frame member, and against which the arm rests when raised. These two side members 25 and 26 are provided with holes that align with those of the side members of the frame 11 and together with said holes in the side members serve to receive the pivotal bolt 23 upon which the arm is pivoted.

As a means of operating the arm against gravity, I provide a chain 31 one end of which is connected to the arm 22 at 32 and the other end to a hole 33 in the end portion 14 of the steel spring member 12, said chain extending from the point of attachment at 32 over and in engagement with the edge 34 of the cross member 35 of the arm 22, and likewise over the upper bent portion 20 of the spring member 12, being guided thereon through a loop 36 attached to said spring member.

From the foregoing it will be seen that when the driver places his hand in between the chain 31 and the spring 12 and rests it in the lower bent portion 14 of the spring member 12, and then presses or pushes inward upon the chain, to position shown in Fig. 2, it will cause the chain to tighten and pull on the edge 34 of the arm 22 causing the arm to readily swing outward and upward on its pivot bolt 23, from its depending position, until the chain becomes disengaged from the edge 34 of the arm, whereupon the pull of the chain becomes direct at the point of attachment 32 of the arm and whereby it can be carried up to either a horizontal or to the further raised vertical position. In this connection it will be understood that the engagement with the hole 27 carried by the member 26, by the boss 28 in the side of the frame 11, is a yieldable frictional engagement so that the arm can be readily moved out of engagement with the boss, whereby with the complete release of the chain the arm will drop as by gravity to the depending position. While I have referred to the member 31 as a chain, yet it will be understood that a cord or the like can be used as well.

Having thus described my invention what I claim and desire to secure by Letters Patent is:

1. An automobile signaling device comprising a frame member having opposed side portions, a looped spring member secured to the back of said frame adapted to extend up the outside, over the top and down the inside of a window glass, cushioning members carried by the frame and spring to engage the top edge and opposite side portions of the glass, an arm hingedly mounted between the said opposed side portions of the frame adapted to be swung from a depending to horizontal and vertical positions, a chain connected to the arm and extended up over the top and attached to the free end of the spring.

2. An automobile signaling device comprising a frame member having opposed side portions, a looped spring member attached to the back of said frame adapted to extend up the outside, over the top and down the inside of a window glass, cushioning members carried by the frame and spring to engage the top edge and opposite side portions of the glass, an arm hingedly mounted between the said opposed side portions of the frame adapted to be swung from a depending to horizontal and vertical positions, a chain connected to the arm and extended up over the loop of the spring, and means carried by the loop end of the spring to guide the chain thereover in its movement of operating the arm.

3. An automobile signaling device comprising a frame member having opposed side portions, a looped spring member attached to said frame adapted to extend up the outside, over the top and down the inside of a window glass, cushioning members carried by the frame and spring to engage the top edge and opposite side portions of the glass, an arm hingedly connected to the frame and having parallel pivotal end portions adapted to be swung from a depending to horizontal and vertical positions, a chain connected to a portion of the arm and extended up over the loop of the spring.

4. An automobile signaling device comprising a frame member having opposed side portions, a looped spring member attached to the back of said frame adapted to extend up the outside, over the top and down the inside of a window glass, cushioning members carried by the frame and spring to engage the top edge and opposite side portions of the glass, an arm hingedly mounted between the said opposed side portions of the frame adapted to be swung from a depending to horizontal and vertical positions, a chain connected with the arm forward of its pivot and so arranged as to first engage the arm above its pivot to insure its preliminary movements, and then forward of the pivot to insure further and final movement.

5. An automobile signaling device comprising a frame member having opposed side portions, a looped spring member attached to the back of said frame adapted to extend up the outside, over the top and down the inside of a window glass, cushioning members carried by the frame and spring to engage the top edge and opposite side portions of the glass, an arm hingedly mounted between the said opposed side portions of the frame adapted to be swung from a depending to a horizontal and vertical position, the said frame including a stop across its upper end against which the arm abuts to limit its upward movement, and detent means intermediate the arm and frame whereby the movement of the arm is temporarily arrested during its swinging movements.

6. An automobile signaling device comprising a frame member having opposed side portions, a looped spring member attached to the back of said frame adapted to extend up the outside, over the top and down the inside of a window glass, cushioning members carried by the frame and spring to engage the top edge and opposite side portions of the glass, an arm hingedly mounted between the said opposed side portions of the frame adapted to be swung from a depending to horizontal and vertical positions, the said arm including a reflecting means, and a chain connected to the arm and extended up over the loop of the spring.

Signed at Bridgeport in the county of Fairfield and State of Connecticut this 28th day of January, A. D. 1932.

ARTHUR W. REYNOLDS.